(12) United States Patent
Kolar et al.

(10) Patent No.: US 7,062,546 B1
(45) Date of Patent: Jun. 13, 2006

(54) NETWORK DEVICE CHANNEL CONFIGURATION

(75) Inventors: Timothy D. Kolar, San Jose, CA (US); Michael J. Beesley, Hillsborough, CA (US); Dennis C. Ferguson, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 728 days.

(21) Appl. No.: 10/072,428

(22) Filed: Feb. 7, 2002

(51) Int. Cl.
*G06F 15/177* (2006.01)

(52) U.S. Cl. ............... 709/220; 709/223; 717/168; 717/171; 717/172; 717/174

(58) Field of Classification Search ........... 709/220, 709/223; 715/853; 717/168, 172, 171, 174
See application file for complete search history.

(56) References Cited

U.S. PATENT DOCUMENTS 6,650,347 B1 * 11/2003 Nulu et al. ................ 709/223

6,744,446 B1 * 6/2004 Bass et al. .................. 715/734
2003/0101248 A1 * 5/2003 Tofinetti et al. ............ 709/223

OTHER PUBLICATIONS

"Multichannel WAN Aggregation in the Enterprise," Cisco Systems, Inc., 1998.

* cited by examiner

*Primary Examiner*—John Follansbee
*Assistant Examiner*—Ashok B. Patel
(74) *Attorney, Agent, or Firm*—Shumaker & Sieffert, P.A.

(57) ABSTRACT

A network device supports an interface by which a user enters text-based configuration input that describes the channelization of a network link. The configuration input includes one or more text blocks of that define and hierarchically relate a data channel and at least one data sub-channel. The network device may include a control unit to communicate data packets over a channelized network link according to the configuration input. Accordingly, the user can view the text block for a particular channel or sub-channel without having to significantly scroll the display. In addition, the configuration input for the channels can readily be stored in multiple configuration files, and need not be maintained in a single file having continuous, nested levels configuration input.

32 Claims, 9 Drawing Sheets

FIG. 8

NETWORK DEVICE CHANNEL CONFIGURATION

TECHNICAL FIELD

The invention relates to computer devices and, more particularly, to techniques providing a user interface to a computer device.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet to identify the destination for the packet. Based on the destination, the router forwards the packet in accordance with the routing information.

The physical connection between devices within the network is generally referred to as a link. In order to increase efficiencies, a single link may "channelized" to carry multiple data streams. Specifically, the available bandwidth of the link may be segmented into multiple channels. These channels may be further channelized into smaller channels, also referred to as sub-channels. The smallest accessible bandwidth portion is often referred to as a timeslot, and is typically 64 kilobits per second (kbps) referred to as DS0. The following table illustrates conventional channelization of link bandwidth:

TABLE 1

| T1 | 24 * DS0 |
|---|---|
| E1 | 32 * DS0 |
| T3/DS3 | 28 * DS0 |
| E3 | 21 * E1 |
| OC3 | 63 * E1 or 3 * E3 |
| OC3 | 84 * T1 or 3 * T3 |
| OC12 | 4 * OC3 or 12 * DS3 |
| OC48 | 4 * OC12 |
| OC192 | 4 * OC48 |
| OC768 | 4 * OC192 |

In this fashion, telecommunication carriers can offer links having a wide variety of bandwidth to the end user. For example, an individual user may access the network using a relatively low-bandwidth channel having one or more DS0s, such as a digital subscriber line (DSL), integrated services digital network (ISDN) connection, or the like. Small to medium size corporations, however, may require more bandwidth as provided by a T1 channel or an E1 channel. Large organizations may require significant bandwidths provided by a T3 channel. The higher order channels are typically used between telecommunications carriers, Internet Service Providers, and the like.

One drawback of channelized links is that each channel requires a physical interface and a channel service unit/digital service unit (CSU/DSU) or similar device to convert between the serial interface of the channel to the transmission technology of the telecommunication carrier. As the number of channels increases, these devices can consume significant rack space, and the myriad of cables can become difficult to manage.

Recently, routers have been developed that directly support channelized data streams, thereby eliminating the need for CSU/DSUs and complex cabling. In this manner, a router may aggregate channels having a wide variety of bandwidth, and channels from a wide variety of end users, such as remote individuals, branches, and organizations.

In order to support channelized data streams, a system administrator or other user must configure the router by specifying how a particular link is to be channelized. In particular, the administrator must specify the various channels, and the bandwidth allocation for each channel. In addition, each channel may have particular configuration options, such as clocking and timing requirements, loopback options, path and mapping options, and the like. As the level of channelization increases for a given link, configuring the router itself can become a complex task for the administrator.

Conventional routers typically support a text-based interface in which the administrator enters configuration input that describes the channelization of the network link in a continuous, nested format. The following illustrates example configuration input conforming to a format supported by a conventional router. In particular, the following illustrates configuration of a channelized DS3 link having a number of T1 channels that are further partitioned into DS0 channel:

```
interface oc12-1/1/1
{
    interface ds3-1/1/1:0
    {
        . . .
        ds3 configuration data
        . . .
        interface t1-1/1/1:0:0
        {
            . . .
            t1 configuration data
            . . .
            interface ds0-1/1/1:0:0:0
            {
                . . .
                ds0 configuration data
                . . .
            }
            interface ds0-1/1/1:0:0:1
            {
                . . .
                ds0 configuration data
                . . .
            }
            . . . etc . . .
        }
    }
    interface ds3-1/1/1:1
    {
        . . .
        ds3 configuration data
        . . .
        interface t1-1/1/1:1:0
        {
            . . .
            t1 configuration data
            . . .
            interface ds0-1/1/1:1:0:0
            {
```

```
    ...
    ds0 configuration data
    ...
      }
    }
  }
}
```

In this manner, the administrator describes the channelization of the network in a continuous, nested format. As the level of channelization increases, this technique can become unwieldy for a human administrator. For example, as the complexity of the channelization supported by the router increases, the level of nesting increases and configuration data may begin wrapping or clipping within the display viewed by the administrator. In addition, the channelization generally becomes difficult to follow as the complexity of the channelization increases. The configuration input relating to a higher-bandwidth channel, such as the D3 channel above, may be incredibly lengthy. As a result, the administrator may need to scroll the display considerably to determine the configuration of a particular channel.

SUMMARY

In general, the invention is directed to techniques for configuring a computer device, such as a network router. According to the principles of the invention, the router provides a text-based interface by which an administrator or other user can easily provide input for configuring the link channelization of the router.

In particular, the network device supports a convenient text-based syntax by which the user can specify each channel within a channelized link. When specifying a particular channel, the user describes the channel in a single text block within the configuration input, and includes references, such as names or other unique labels, that identify the sub-channels into which the channel is partitioned. The network device resolves the references to other text blocks within the configuration input that describe the specified sub-channels. In this manner, the references within the configuration input hierarchically relate the channels and sub-channels to fully describe the channelization of the link.

One embodiment consistent with the principles of the invention is directed to a method comprising receiving configuration input having text defining a data channel and one or more data sub-channels within a network link, and configuring a network device according to the configuration input. The text of the configuration input include references that hierarchically relate the data channel and the data sub-channels. For example, the configuration input may include a block of text for configuring the data channel. The block of text may include references that identify blocks of text for configuring the data sub-channels. The text blocks for the data sub-channels may also include references to other sub-channels to further channelize the network link. The text blocks of the data sub-channels may include unique labels that incorporate the respective references concatenated with channel identifiers according to the hierarchical relationships of the data channel and the data sub-channels.

Another embodiment consistent with the principles of the invention is directed to a network device comprising a computer-readable medium to store configuration input. The configuration input includes text blocks that define a data channel and at least one data sub-channel, and references that hierarchically relate the data channel and the sub-channel. The network device further comprises a control unit to communicate data packets over a channelized network link according to configuration input.

Embodiments consistent with the principles of the invention may offer a number of advantages. For example, the user can view the text block for a particular channel or sub-channel without having to significantly scroll the display. In addition, the configuration input for the channels can readily be stored in multiple configuration files, and need not be maintained in a single file having continuous, nested levels configuration input. Consequently, the administrator may find that loading of the necessary configuration data is more convenient and less prone to error.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 8 is a block diagram illustrating a naming convention for uniquely identifying text blocks of configuration input configuring a channelized link.

DETAILED DESCRIPTION

Figure 1:
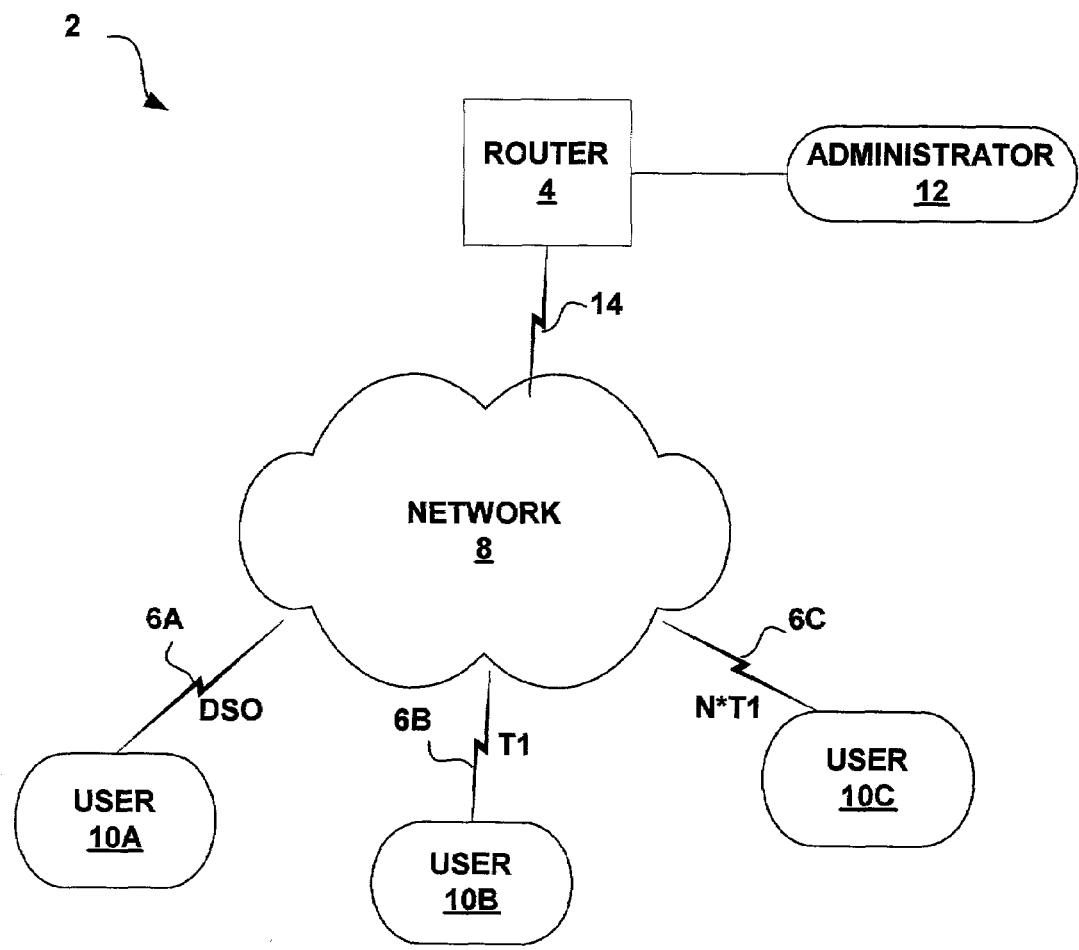
FIG. 1 is a block diagram illustrating an example computer network in which a router supports channelized interfaces.

FIG. 1 is a block diagram illustrating an example computer network 2 in which router 4 supports channelized interfaces to provide various bandwidths to users 10A through 10C, collectively referred to as users 10. Each of users 10 represents an entity, such as an individual or organization, that accesses network 8 via one of links 6A through 6C, collectively referred to as links 6.

Each of links 6 may be partitioned into one or more channels. User 10A may be, for example, an individual accessing network 8 via link 6A, which may be a DS0 channel, such as a digital subscriber line (DSL) or integrated services digital network (ISDN) connection. User 10B, however, may be a small to medium size corporation accessing network 8 via link 6B, which may support a channelized T1. User 10C may be a large organization accessing network 8 via link 6C, which may be channelized into multiple T1s. Network 8 comprises a packet-based digital network, and includes a multiplexed telecommunications infrastructure to service users 10 with links 6 having diverse bandwidths.

Router 4 supports channelized data streams, thereby eliminating the need for separate CSU/DSUs. Administrator 12 or other users configure router 4 by specifying how link 14 is to be channelized through network 8 and links 6.

Router 4 presents a text-based interface by which administrator 12 provides configuration input for specifying the channelization of link 14. More specifically, router 4 supports an easy-to-use text-based syntax by which administrator 12 can specify each channel carried by link 14, such as the channels carried by links 6.

When specifying a particular channel within the configuration input, administrator 12 enters text blocks having references, such as names or other unique labels, for the sub-channels into which the channel is partitioned. For example, administrator 12 may enter a text block that specifies the highest-level channel of link 14 and includes references to the sub-channels into which the bandwidth is partitioned, i.e., the channels carried by network 8 and links 6. These references are then used to uniquely identify blocks within the configuration input that describe the specified sub-channels. Next, administrator 12 enters text blocks that provide configuration information for the sub-channels, and may further partition the sub-channels. In this manner, the references within the configuration input hierarchically relate the channels to describe the channelization of link 14.

Upon receiving the configuration input, router 4 parses the configuration input and resolves the references to appropriately configure the channelization of link 14. Administrator 12 may provide the configuration information using local input/output (I/O) devices coupled directly to router 4, or remotely via a network connection.

Figure 2:
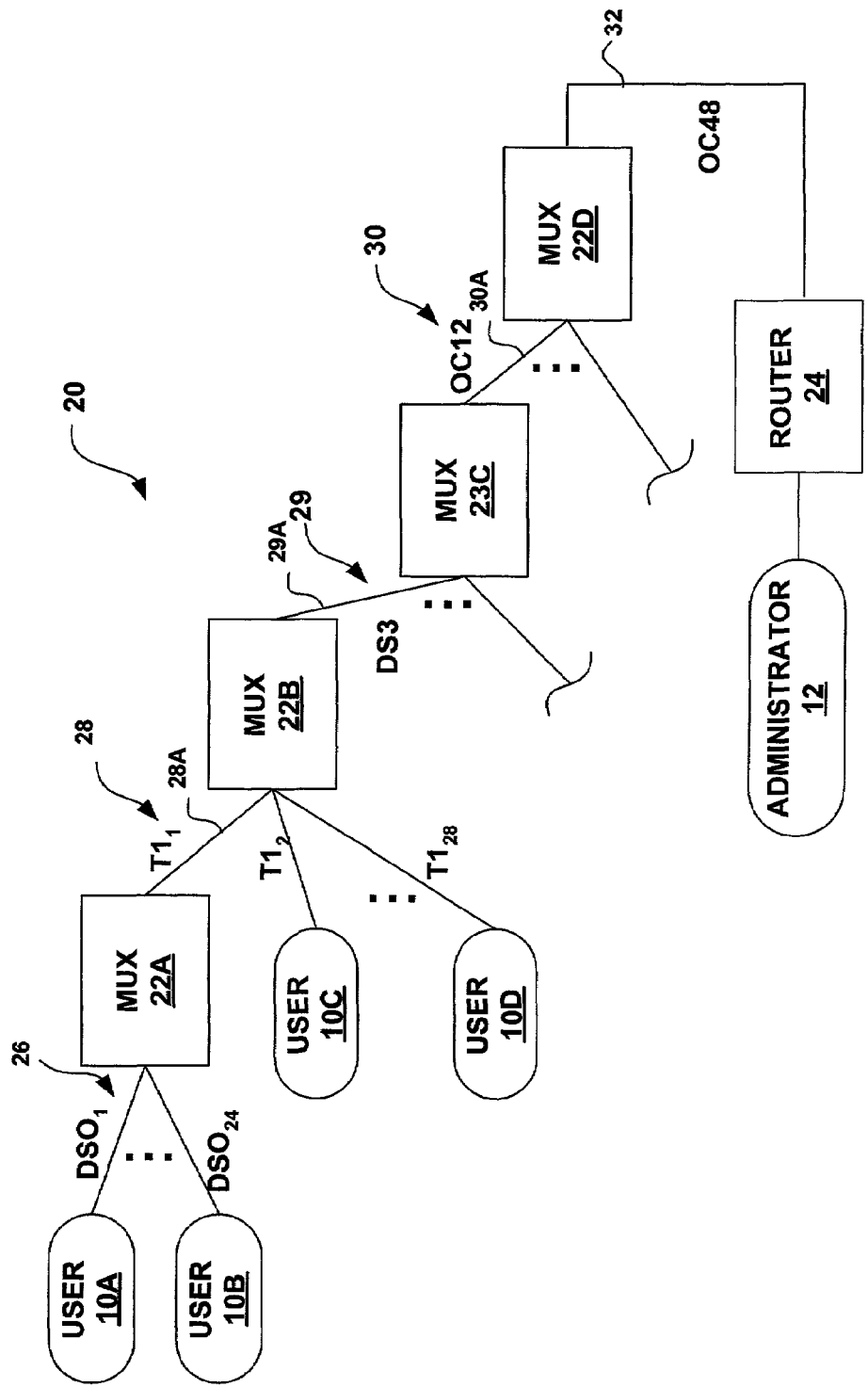
FIG. 2 is a block diagram illustrating another example network.

FIG. 2 is a block diagram illustrating another example network 20. Specifically, network 20 is a multiplexed network comprising a number of multiplexers 22A–22D, collectively referred to as multiplexers 22, that manage packet data streams between higher bandwidth links and a number of lower bandwidth links. For example, multiplexer 22A aggregates packet data streams of links 26 to form channelized link 28. Links 26 may comprise, for example, 32 DS0 channels such that link 28 comprises a channelized T1. Similarly, multiplexers 22B–22D aggregate packet data streams of smaller bandwidth links to form channelized links having higher bandwidth. Finally, multiplexer 22D interfaces with router 24 via link 32, which typically comprises a high-bandwidth channelized link, such as a channelized OC48 link. Accordingly, router 24 includes a channelized interface (not shown) that physically receives link 32, and supports the channelization of link 32 to service users 10 via network 20.

According to the principles of the invention, router 24 supports a text-based interface by which administrator 12 provides configuration input for specifying the channelization of link 32. In other words, router 24 supports an easy-to-use text-based syntax by which administrator 12 can specify each data stream carried by link 32 and communicated throughout network 20. By interacting with the interface and providing configuration input conforming to the syntax, administrator 12 can configure the channels and define the bandwidth allocation for each channel.

When specifying the configuration of link 32, for example, administrator 12 enters text blocks having references, such as names or other unique labels, for the sub-channels into which the channel is partitioned, i.e., links 30. In addition, administrator 12 enters text blocks that provide configuration information for each of links 30, and may further partition the sub-channels. Within the text block configuring link 30A, for example, the administrator 12 includes references to links 29. Similarly, within the text block configuring link 29A, for example, the administrator 12 includes references to links 28. Accordingly, the administrator can provide configuration input for a given channel, and can include unique references to any sub-channels. In this manner, the references within the configuration input hierarchically relate the channels within network 20 to fully describe the channelization of link 32. Router 24 parses the configuration input and resolves the references to appropriately configure the channelization of link 32. Administrator 12 may provide the configuration information using local input/output (I/O) devices coupled directly to router 24, or via a remote connection.

Figure 3:
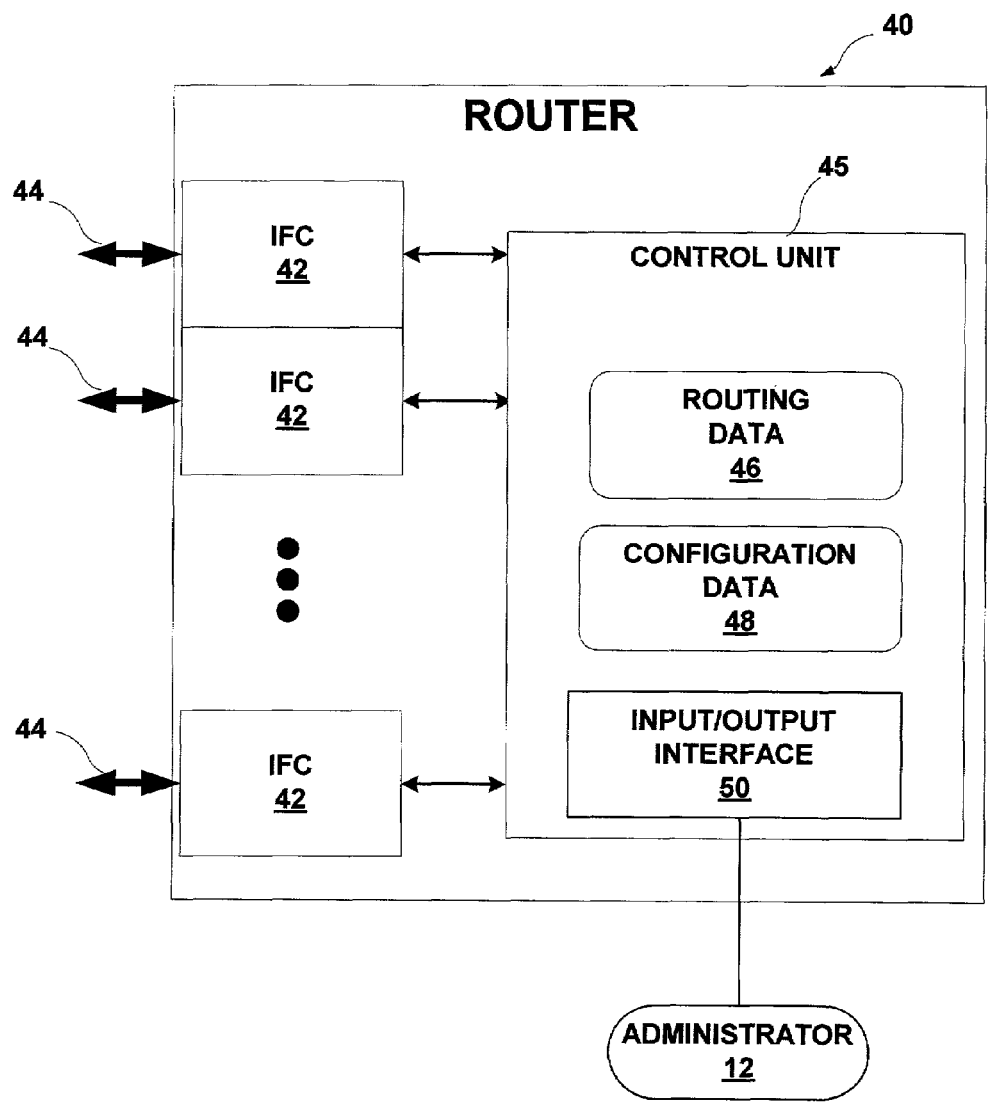
FIG. 3 is a block diagram illustrating an example router consistent with the principles of the invention.

FIG. 3 is a block diagram illustrating an example router 40 consistent with the principles of the invention. In the exemplary embodiment illustrated in FIG. 1, router 40 includes one or more interface cards (IFCs) 42 for sending and receiving packets using network links 44. IFCs 42 are typically coupled to network links 44 via a number of interface ports (not shown).

Router 40 includes a control unit 45 that maintains routing data 46, which may describe, for example, a topology of a network and, in particular, the routes through the network. Routing data 46 may, for example, describes various routes within the network as well as neighboring devices of router 40 along the routes. Routing data 46 may comprise any one of a variety of forms including one or more routing tables, databases, radix trees, and the like. Upon receiving an inbound packet, control unit 45 reads from the packet a block of data, referred to as the "key," that includes a network destination. The key may, for example, contain a routing prefix for another router within the network. In accordance with the key and routing data 46, control unit 45 selects an available route and forwards the packet to one, of IFCs 42 for transmission.

Control unit 45 receives configuration input from an administrator 12 in text-based form via input/output (I/O) interface 50 and configures IFCs 42 accordingly. In particular, control unit 45 may configure one or more of IFCs 42 to support channelization. For example, control unit 45 may set clocking and timing requirements, loopback options, path and mapping options, and the like, in accordance with configuration data 48. Control unit 45 stores the configuration input as configuration data 48, which may take the form of a text file that stores the configuration input from the administrator. Alternatively, control unit 45 may process the text-based input and generate configuration data 48 in any one of a number of forms, such as one or more databases, tables, data structures, and the like. In this manner, control unit 45 supports an easy-to use text-based syntax by which administrator 12 can configure IFCs 42 to support channelization. Administrator 12 may provide the configuration information using local input/output (I/O) interface 50 coupled directly to router 45 or via a remote connection.

Figure 4:
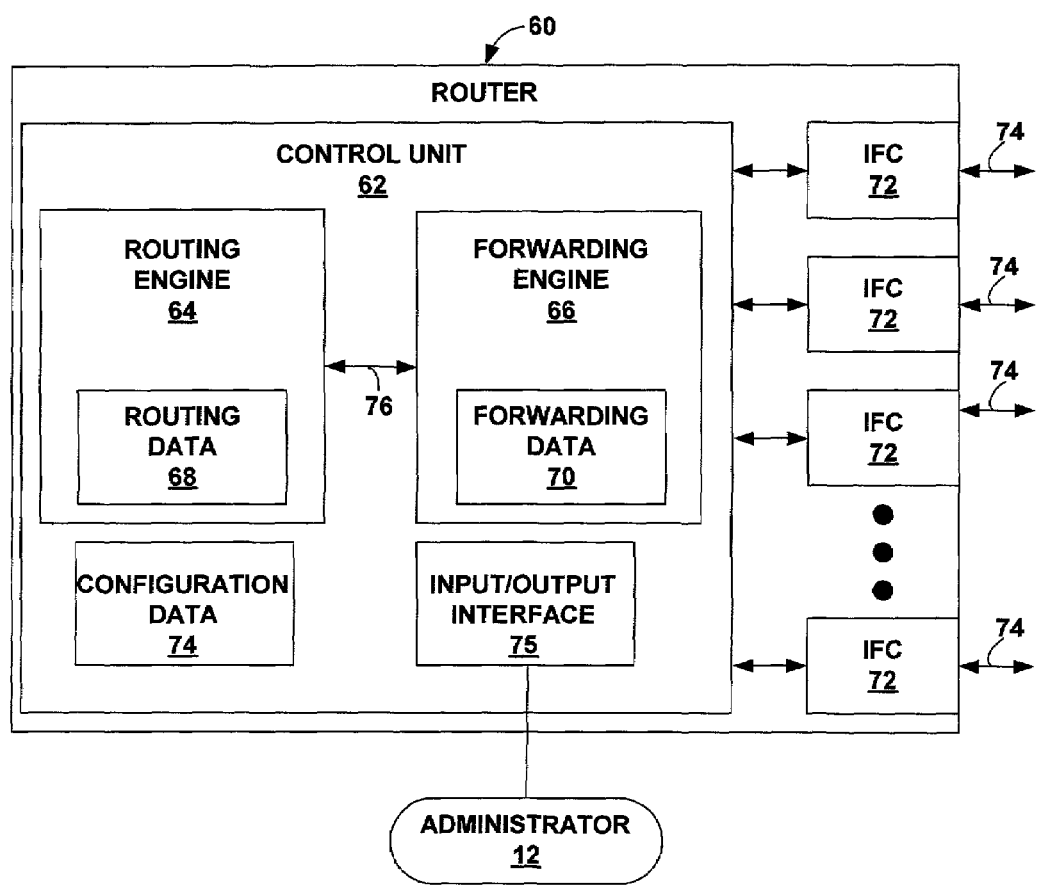
FIG. 4 is a block diagram illustrating another example router consistent with the principles of the invention.

FIG. 4 is a block diagram illustrating another example router 60 consistent with the principles of the invention. In particular, router 60 includes a control unit 62 in which functionality is divided between a routing engine 64 and a forwarding engine 66.

Routing engine 64 is primarily responsible for maintaining routing data 68 to reflect the current network topology. In particular, routing engine 64 periodically updates routing data 68 to accurately reflect the network topology. In accordance with routing data 68, forwarding engine 66 maintains forwarding data 70 that may, for example, associate network destinations with specific next hops and corresponding interface ports of IFCs 72. Forwarding data 70 may therefore be thought of as a specialized subset of the information contained within routing data 68. Upon receiving an inbound packet, forwarding engine 66 directs the inbound packet to appropriate ones of IFCs 72 for transmission based on forwarding data 70. In one embodiment, each of forwarding engine 66 and routing engine 64 may comprise one or more dedicated processors, software, hardware, and the like, and may be communicatively coupled by data communication channel 76. Data communication channel 76 may be a high-speed network connection, bus, shared-memory or other data communication mechanism. Control unit 62 receives configuration input from an administrator 12 in text-based form via input/output (I/O) interface 75, stores the configuration input as configuration data 74, and configures IFCs 72 accordingly.

Figure 5:
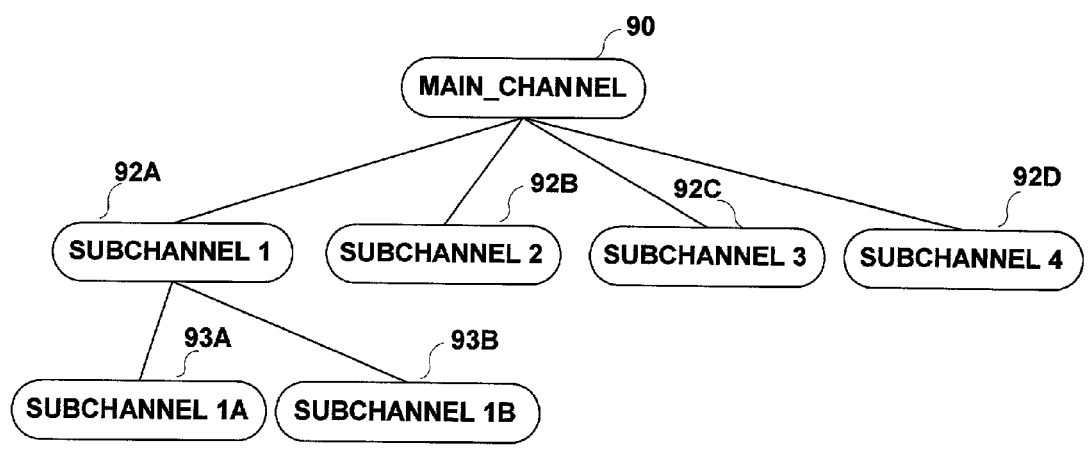
FIGS. 5 and 6 are block diagrams that further illustrate the configuration of a channelized router interface according to the principles of the invention.
Figure 6:
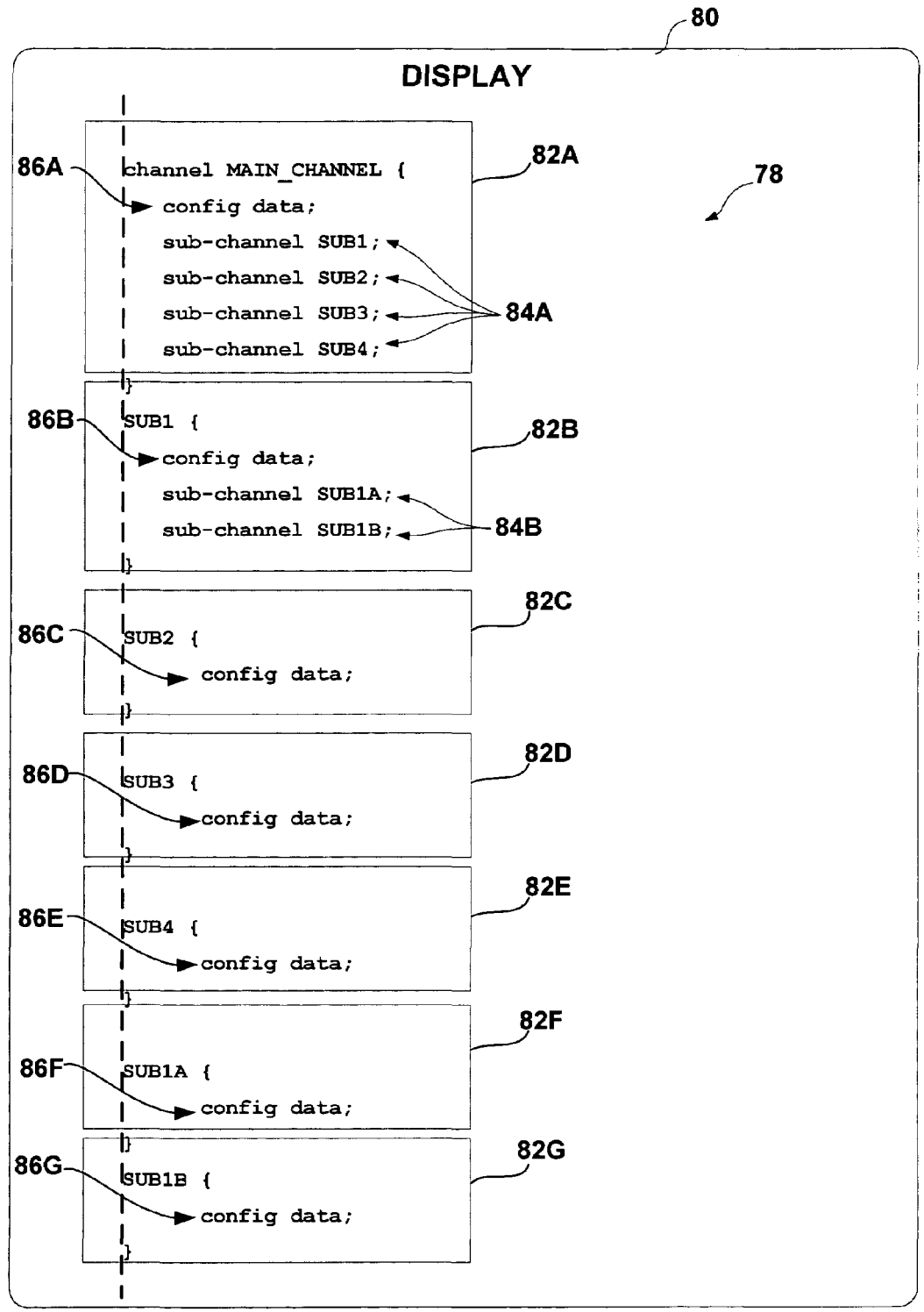
Figure 7:
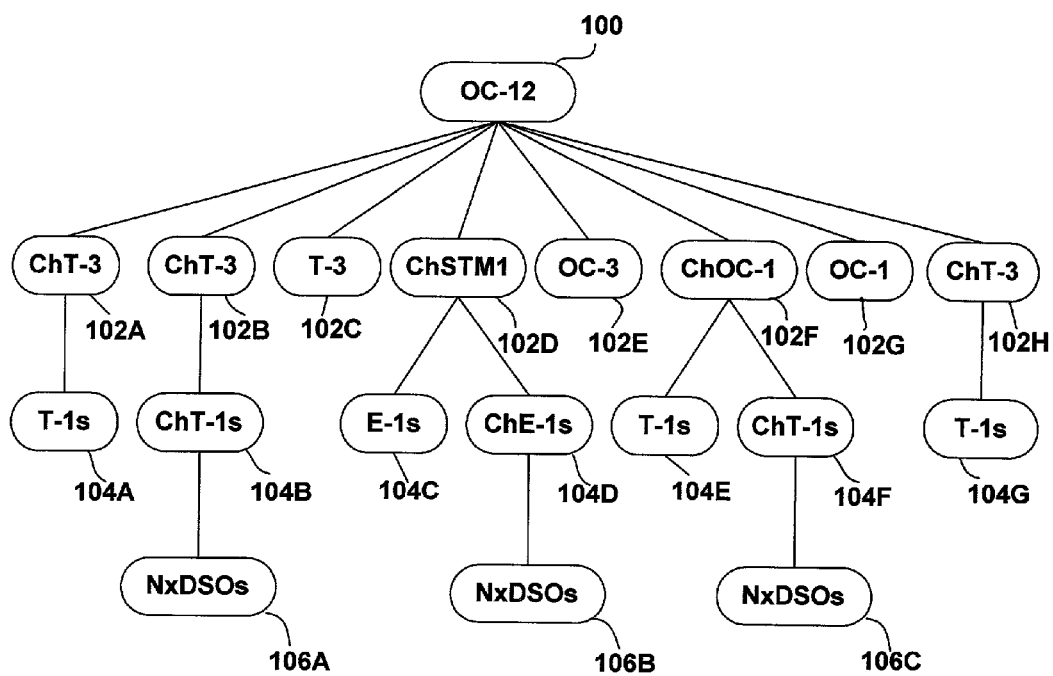
FIG. 7 is a block diagram illustrating a more detailed example of a channelized link.

FIG. 5 and FIG. 6 further illustrate the configuration of a channelized router interface according to the principles of the invention. Specifically, FIG. 5 is a block diagram illustrating an example channelization of a link. The channelized link includes a main channel 90 that is partitioned into four sub-channels 92A through 92D, collectively referred to as sub-channels 92. Sub-channel 92A is further partitioned into sub-channels 93A and 93B, collectively referred to as sub-channels 93. FIG. 7 illustrates an example display 80 with which the administrator 12 interacts to configure a router to support the channelization illustrated in FIG. 5.

To specify the channelization of the link, administrator 12 enters input configuration 78 having text blocks 82A–82G, collectively referred to as text blocks 82, that contain configuration data for the channel 90 or the sub-channels 92, 93. Text block 82A, for example, includes configuration information 86A for the main channel 90.

In addition, text block 82A includes references 84A that segment main channel 90 into four sub-channels 92A–92D. In the illustrated example, each of references 84A includes a keyword "sub-channel" followed by a unique reference for the corresponding sub-channel, such as SUB1–SUB4.

Administrator 12 specifies the configuration of sub-channels 92 using additional text blocks 82B through 82E. Within each text block 82B through 82E, administrator 12 includes configuration data 86, and may include additional references to further partition main channel 90 into additional sub-channels. Text block 82B, for example, includes references 84B to partition sub-channel 92A into sub-channels 93A and 93B. In this manner, references 84 hierarchically relate text blocks 82 to fully describe the channelization of main channel 90. Advantageously, the text-based interface supported by the router allows the administrator 12 to specify configuration data for channelized interfaces without requiring continuous levels of nesting of the configuration information, as is common with conventional routers. Instead, the information associated with a sub-channel may be set forth elsewhere, e.g., below the configuration information for the highest-level channel. The text blocks may be justified at a common margin, as illustrated in FIG. 6 by the vertical broken line. Text blocks may also be aligned near a common margin, but offset slightly to provide a visual sense of hierarchy among the text blocks.

FIG. 7 is a block diagram illustrating a more detailed example of a channelized link. In particular, the channelized link comprises an OC-12 link 100 that is partitioned into eight sub-channels 102A through 102H. Specifically, the eight channels of OC-12 link 100 comprise twelve slices as follows:

TABLE 2

| | |
|---|---|
| SLICE 1 | A channelized T3 102A further partitioned into T1s 104A |
| SLICE 2 | A channelized T3 102B further partitioned into channelized T1s 104B. |

TABLE 2-continued

| | |
|---|---|
| | The channelized T1s 104B are channelized into DS0s 106A. |
| SLICE 3 | A clear channel T3 102C |
| SLICE 4–6 | A channelized STM1 102D further partitioned into unchannelized E1s 104C and channelized E1s 104D The channelized E1s 104D are further channelized into DS0s 106B. |
| SLICE 7–9 | A POS OC3 interface 102E |
| SLICE 10 | A channelized OC1 102F mapped to ten clear channel T1s 104E and eighteen T1s 104F that are channelized further into DS0s 106C |
| SLICE 11 | A POS OC1 interface 102G |
| SLICE 12 | A channelized T3 102H further channelized into T1s 104G |

The following pseudocode further illustrates example configuration input for configuring a channelized interface to support the OC-12 link 100 of FIG. 7 consistent with the principles of the invention:

```
channel OC12_CHANNEL {
    sub-channel 1 oc-slice 1 interface CT3;           #CT3:1
    sub-channel 2 oc-slice 2 interface CT3;           #CT3:2
    sub-channel 3 oc-slice 3 interface T3;            #T3:3
    sub-channel 4 oc-slice 4–6 interface CSTM1;       #CSTM1:4
    sub-channel 5 oc-slice 7–9 interface SO;          #SO:5
    sub-channel 6 oc-slice 10 interface COC1;         #COC1:6
    sub-channel 7 oc-slice 11 interface SO;           #SO:7
    sub-channel 8 oc-slice 12 interface CT3;          #CT3:8
}
CT3:1 {
    sonet-options { . . . }
    t3-options { . . . }
    sub-channel 1–28 interface T1;                    #T1:1:[1–28]
}
CT3:2 {
    sonet-options { . . . }
    t3-options { . . . }
    sub-channel 1–28 interface CT1;                   #CT1:2:[1–28]
}
T3:3 {
    sonet-options { . . . }
    t3-options { . . . }
    interface-options { . . . }
}
CSTM1:4 {
    sonet-options { . . . }
    subchannel 1–10 interface E1;                     #E1:4[1–10]
    subchannel 11–63 interface E1;                    #E1:4:[11–63]
}
SO:5 {
    sonet-options { . . . }
    interface-options { . . . }
}
COC1:6 {
    sonet-options { . . . }
    sub-channel 1–10 interface T1;                    #T1:6:[1–10]
    sub-channel 11–28 interface CT1;                  #CT1:6:[11–28]
}
SO:7 {
    sonet-options { . . . }
    interface-options { . . . }
}
CT3:8 {
    sonet-options { . . . }
    t3 options { . . . }
    sub-channel 1–28 interface T1;                    #T1:8:[1–28]
}
CT1:4:11 {
    e1-options { . . . }
    sub-channel 1 time-slots 1–4 interface DS0;       #DS0:4:11:1
    sub-channel 2 time-slots 5–6 interface DS0;       #DS0:4:11:2
```

-continued

```
sub-channel 3 time-slots 7–8, 10–12 interface DS0;   #DS0:4:11:3
sub-channel 4 time-slots 9 interface DS0;            #DS0:4:11:4
sub-channel 5 time-slots 13–32 interface DS0;        #DS0:4:11:5
}
CT1:6:11 {
t1-options { . . . }
sub-channel 1 time-slots 0–10 interface DS0;         #DS0:6:11:1
sub-channel 2 time-slots 11–23 interface DS0;        #DS0:6:11:2
}
```

Within the above pseudocode, the configuration input includes a number of text blocks describing channels 100, 102, 104, 106. In addition to interface-specific configuration options, a number of the text blocks include references that partition the channel into sub channels. In particular, the text blocks may include references conforming to the following format:

sub-channel N interface NAME; #COMMENT

In this format, the :keyword "sub-channel" indicates to the router that the channel or sub-channel is to be partitioned, N is a unique channel identifier, "interface" is a keyword indicating a channel reference is to follow, and NAME represents a label assigned by the administrator to the allocated channel.

As illustrated in the above pseudocode, each text block for sub-channels is introduced within the configuration input with a preamble conforming to the following format:

NAME:A:B:C . . . :N {

Figure 8:
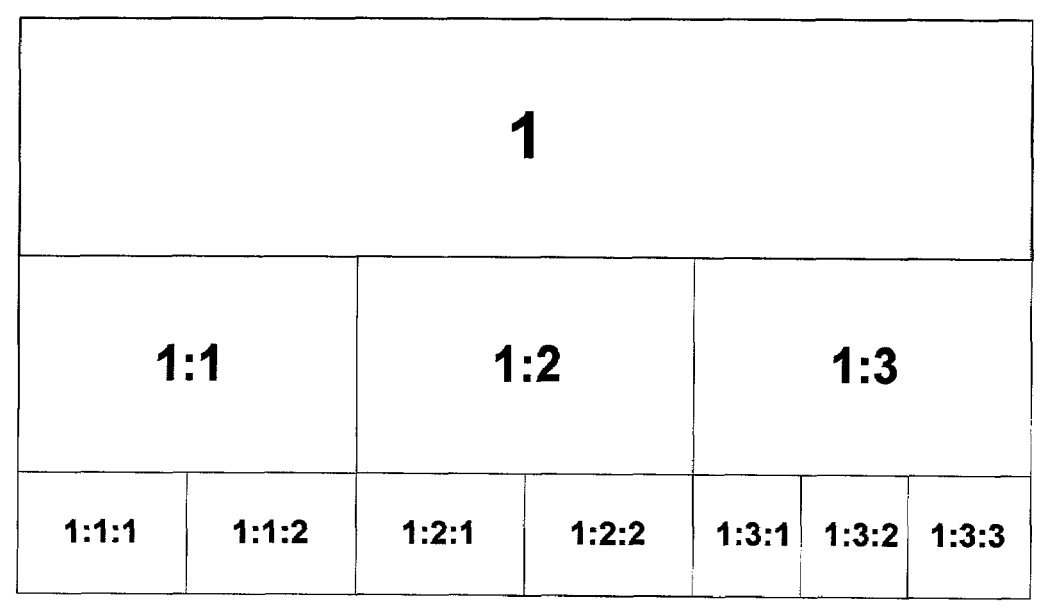

In the above format, NAME indicates the name assigned to the sub-channel by a reference within another text block, unless the text block is describing the highest-level channel. The NAME is then concatenated with one or more channel identifiers according to the hierarchical relationships of the channels. In other words, the series of channel identifies concatenated to the NAME relate the allocated channel to higher-level channels from which the channel is segmented. Within the pseudocode listed above, for example, the following preamble CT1:4:11 introduces a text block for a channelized T1 that is allocated as the eleventh channel (one of 104D) within the fourth channel 102D of the main channel 100. FIG. 8 is a block diagram further illustrating the naming convention for the text blocks as supported by the text-based interface.

Figure 9:
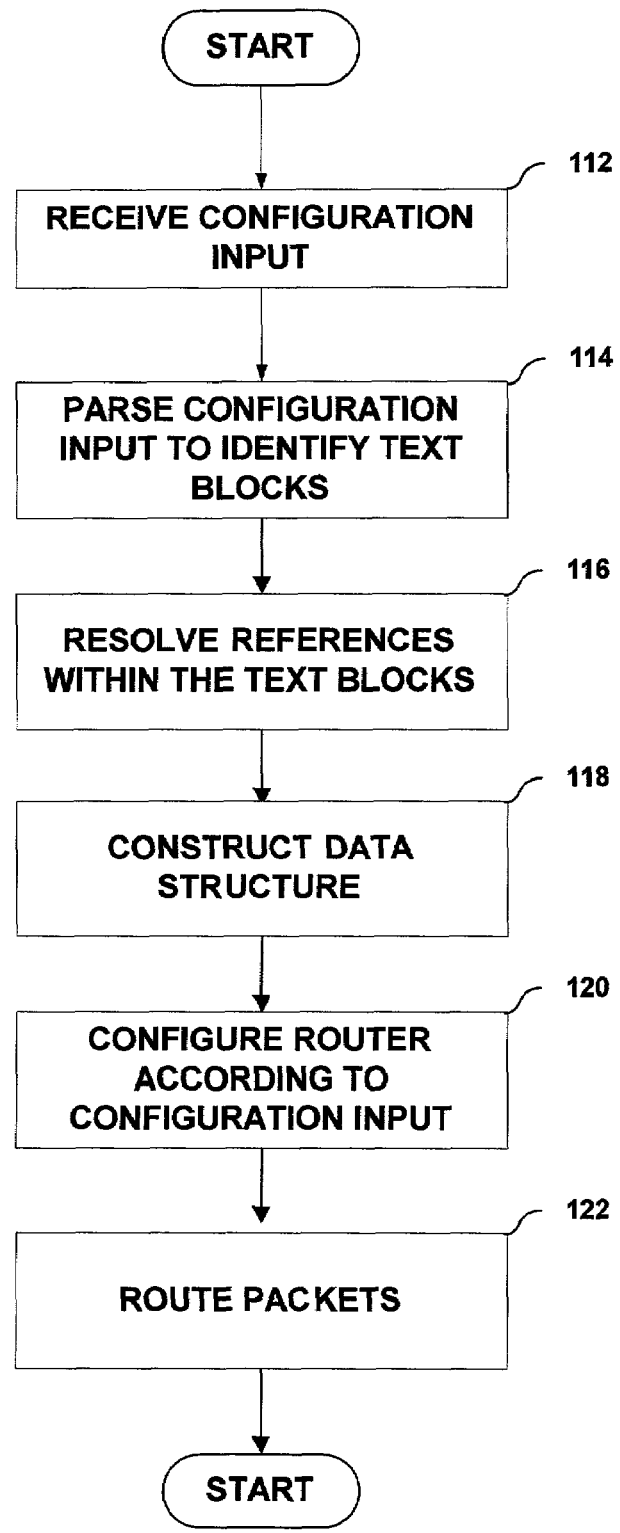
FIG. 9 is a flow chart illustrating an example operation of a router consistent with the principles of the invention.

FIG. 9 is a flow chart illustrating an example operation of a router consistent with the principles of the invention. Initially, the router receives configuration input from an administrator or other user that specifies the channelization of a link in text-based form (112). Upon receiving the configuration input, the router parses the configuration to identify any text blocks and any references to sub-channels (114).

Next, the router resolves the sub-channel references to respective text blocks within the configuration input (116). Upon resolving the references, or during the resolution, the router may construct a data structure according to the relation of the text blocks (118). The data structure may be hierarchical in form, and may reflect the channelization of the link. Based on the configuration input, the router configures one or more interface cards or other hardware to support the channelized link as specified (120). Finally, the router routes packets according to the channelization (122).

Various embodiments of the invention have been described. These and other embodiments are within the scope of the following claims.

The invention claimed is:

1. A method comprising:
   receiving, with a text-based interface, configuration input having a first text block defining a data channel and one or more additional text blocks not contained within the fast text block that define one or more data sub-channels within a network link, wherein the first text block include references that hierarchically relate the data channel and the data sub-channels, wherein the references are labels that uniquely identify the one or more other non-nested text blocks that are external to the first text block; and
   configuring a network device according to the configuration input, wherein the other non-nested text blocks include a second text block, wherein the first text block includes configuration data for the data channel and a reference to a first data sub-channel, and wherein the second text block includes configuration data for the first data sub-channel.

2. The method of claim 1, wherein configuring the network devices comprises:
   resolving the references to the text blocks within the configuration input; and
   constructing a hierarchical data structure to store the configuration input based on the resolution of the references.

3. The method of claim 1, further comprising displaying a representation of the configuration input to a user.

4. The method of claim 3, wherein displaying a representation comprises justifying the first text block and the additional text blocks at or near a common margin within a display.

5. The method of claim 1, wherein the references comprise user-defined names for the data channel and data sub-channels.

6. The method of claim 1, wherein configuring the network device comprises configuring an interface of the network device to channelize input and output data according to the configuration input.

7. The method of claim 1, further comprising routing packets based on the configuration information.

8. The method of claim 1, wherein receiving configuration input comprises receiving configuration input from a user via a local interface.

9. The method of claim 1, wherein receiving configuration input comprises receiving configuration input from a remote user via a network connection.

10. The method of claim 1, wherein the configuration input includes labels for the text of the date sub-channels, and each label comprises the respective reference concatenated with one or more channel identifiers according to the hierarchical relationships of the data channel and the data sub-channels.

11. A computer-readable medium having executable instructions for configuring a network device upon receiving configuration input through a text-based interface, wherein the configuration input comprise a first text block defining a data channel and one or more additional blocks not nested within the first text block that define at least one data sub-channel within a network link, wherein the first text block includes references to the additional text blocks to uniquely identify the additional non-nested text blocks external to the first text block and hierarchically relate the data channel and the sub-channel, wherein the one or more additional text blocks includes a second text block, wherein the first text block includes configuration data for the data channel and a reference to a first data sub-channel, and wherein the second, text block includes configuration data for the first data sub-channel.

12. The computer-readable medium of claim 11, wherein the references comprise user-defined names for the data channel and the data sub-channel.

13. The computer-readable medium of claim 11, wherein the configuration input includes labels for the text of the data sub-channel, wherein each label comprises the respective reference concatenated with one or more channel identifiers according to the hierarchical relationships of the data channel and the data sub-channel.

14. A network device comprising:
   a computer-readable medium to store configuration input having a first text block defining a data channel and a set of additional non-nested text blocks external to the first text block defining at least one data sub-channel, wherein the text blocks include references that uniquely identify the set of non-nested text blocks that are external to the first text block and relate the data channel and the sub-channel; and
   a control unit to communicate data over a channelized network link according to the configuration input received by a text-based interface, wherein the configuration input includes a first channel definition block having configuration data for the data channel and a reference to a first sub-channel, and a second channel definition block having configuration data for the first data sub-channel.

15. The network device of claim 14, further comprising an interface card for coupling to the network link, wherein the control unit configures the interface card according to the configuration input.

16. The network device of claim 14, further comprising a configuration module to receive the configuration input from a user.

17. The network device of claim 14, wherein the configuration module receives the configuration via a local interface.

18. The network device of claim 14, wherein the configuration module receives the configuration information via a network connection.

19. The network device of claim 14, wherein the references comprise user-defined names for the data channel and data sub-channel.

20. The network devise of claim 14, wherein the references hierarchically relate the data channel and the sub-channels.

21. The network device of claim 14, wherein the control unit resolves the references to construct a hierarchical data structure representing channelization of an interface of the network device.

22. The network device of claim 14, wherein the control unit comprises:
   a routing engine to store routing information representing a topology of a network; and
   a packet-forwarding engine to store packet-forwarding information in accordance with the routing information.

23. A computer-readable medium having instructions therein for causing a processor within a network device to:
   present a text-based interface to receive configuration input having a first text block defining a data channel and a set of additional non-nested text blocks external to the first text block defining one or more data sub-channels within a network link, wherein the text blocks include references that uniquely identify the set of non-nested text blocks that are external to the first text block and hierarchically relate the data channel and the data sub-channels; and
   configure the network device according to the configuration input,
   wherein the set of additional non-nested text blocks include a second text block, wherein the first text block includes configuration data for the data channel and a reference to a first data sub-channel, and wherein the second text block includes configuration data for the first data sub-channel.

24. The computer-readable medium of claim 23, wherein each of the references identifies a respective one of the additional, non-nested text blocks within the configuration input.

25. The computer-readable medium of claim 23, further comprising instructions that cause the processor to:
   resolve each of the references to a respective one of the text blocks within the configuration input; and
   construct a hierarchical data structure to store the configuration input based on the resolution of the references.

26. The computer-readable medium of claim 23, wherein the instructions cause the processor to display the configuration input to the user.

27. The computer readable medium of claim 26, wherein the instructions cause the processor to justify the first text block and the additional text blocks at or near a common margin.

28. The computer-readable medium of claim 23, wherein the references comprise user-defined names for the data channel and data sub-channel.

29. The computer-readable medium of claim 23, wherein the instructions cause the processor to configure an interface of a network device to channelize input and output packets according the configuration input.

30. The computer-readable medium of claim 23, wherein the instructions cause the processor to route data based on the configuration information.

31. The computer-readable medium of claim 23, wherein the instructions cause the processor to receive configuration input from a user via a local interface.

32. The computer-readable medium of claim 23, wherein the instructions cause the processor to receive configuration input from a remote user via a network connection.

* * * * *

UNITED STATES PATENT AND TRADEMARK OFFICE
CERTIFICATE OF CORRECTION

| | |
|---|---|
| PATENT NO. | : 7,062,546 B1 |
| APPLICATION NO. | : 10/072428 |
| DATED | : June 13, 2006 |
| INVENTOR(S) | : Timothy D. Kolar, Michael J. Beesley and Dennis C. Ferguson |

It is certified that error appears in the above-identified patent and that said Letters Patent is hereby corrected as shown below:

On Column 10, line 6 (claim 1), "fast" should read --first--.

On Column 11, line 45 (claim 20), "devise" should read --device--.

Signed and Sealed this

Twenty-ninth Day of May, 2007

JON W. DUDAS
*Director of the United States Patent and Trademark Office*